United States Patent [19]

Anderson

[11] 4,352,168

[45] Sep. 28, 1982

[54] DIVER'S BOTTOM TIMER/DEPTH GAUGE OR THE LIKE AND DIRECT DIGITAL INPUT AND TRACKING SYSTEM THEREFOR

[76] Inventor: Robert D. Anderson, 3936 Hendrix St., Irvine, Calif. 92714

[21] Appl. No.: 139,741

[22] Filed: Apr. 14, 1980

[51] Int. Cl.³ .................... G04B 47/00; G01L 7/20; G08C 9/00
[52] U.S. Cl. ........................................ 368/10; 73/384; 73/723; 340/347 P
[58] Field of Search ............................ 368/10, 11, 12; 73/384–387, 701, 712, 723, 729, 732, 733, 741, 742, 753; 340/347 P, 347 AD, 626; 235/92 MP

[56] References Cited

U.S. PATENT DOCUMENTS

| | | | |
|---|---|---|---|
| 3,781,866 | 12/1973 | Kilst | 340/347 P |
| 3,953,847 | 4/1976 | Younkin et al. | 73/384 X |
| 3,992,949 | 11/1976 | Edmondson | 368/10 X |
| 4,117,724 | 10/1978 | Cook | 73/729 |
| 4,163,230 | 7/1979 | Kenii | 340/765 |
| 4,279,028 | 7/1981 | Lowdenslager et al. | 368/11 |

*Primary Examiner*—Vit W. Miska
*Attorney, Agent, or Firm*—Quaintance & Murphy

[57] ABSTRACT

A meter for divers which records and displays depth and elapsed time of dive information in LCD format including a microprocessor for recording and displaying essential dive information, a sensor, responsive to ambient pressure and variations in such pressure, and a direct digital input and tracking system for transmitting sensed information directly to the microprocessor.

6 Claims, 13 Drawing Figures

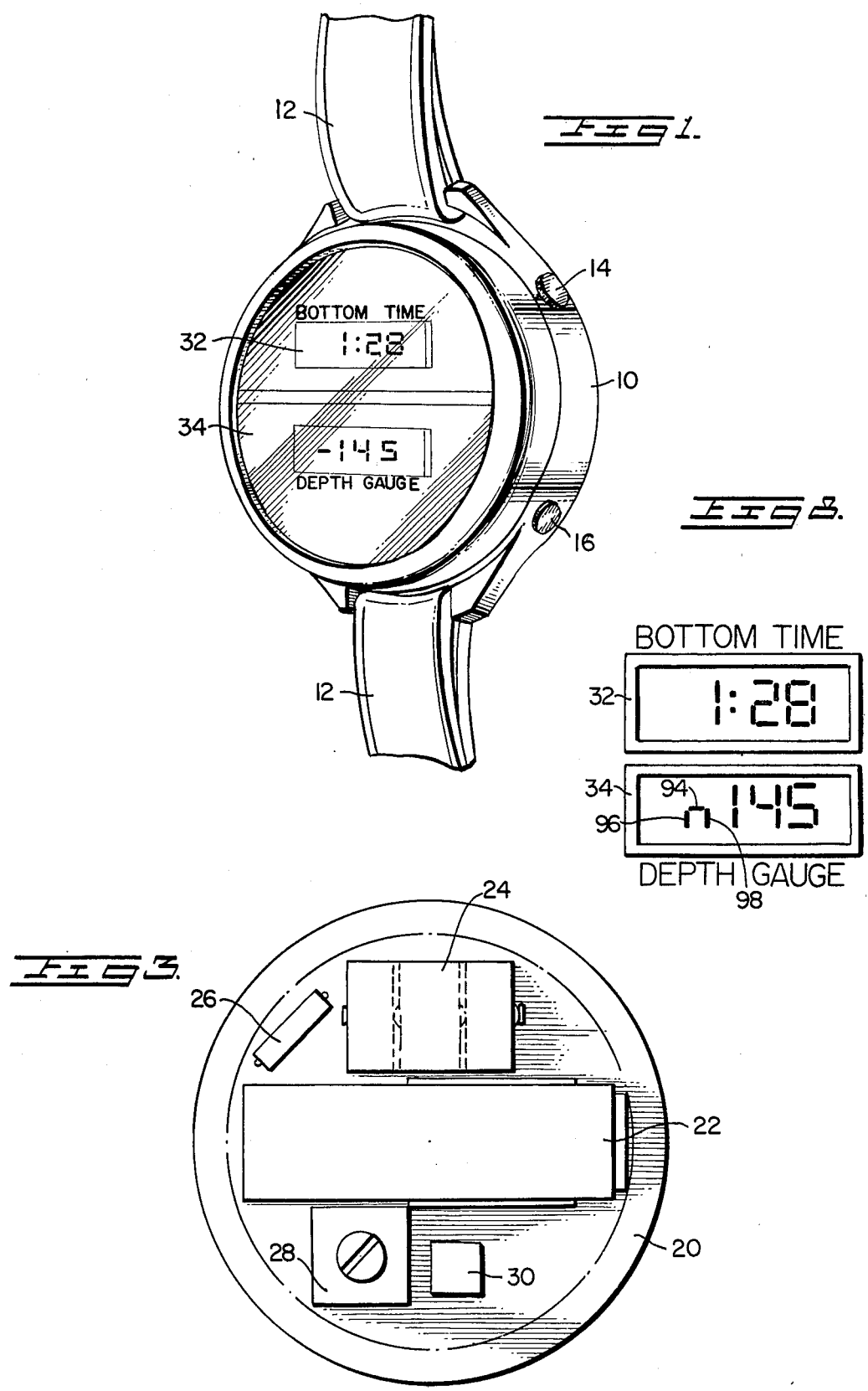

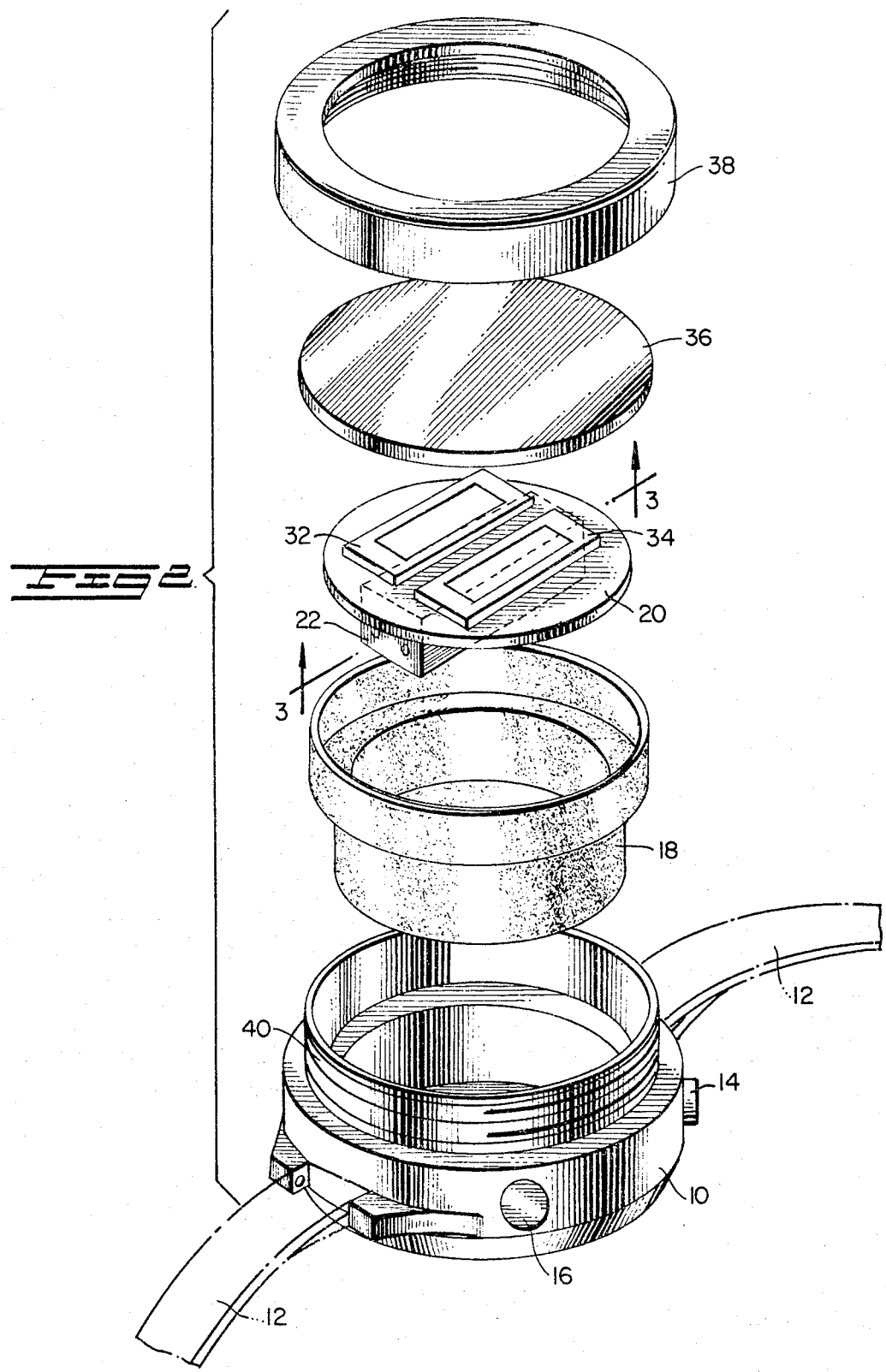

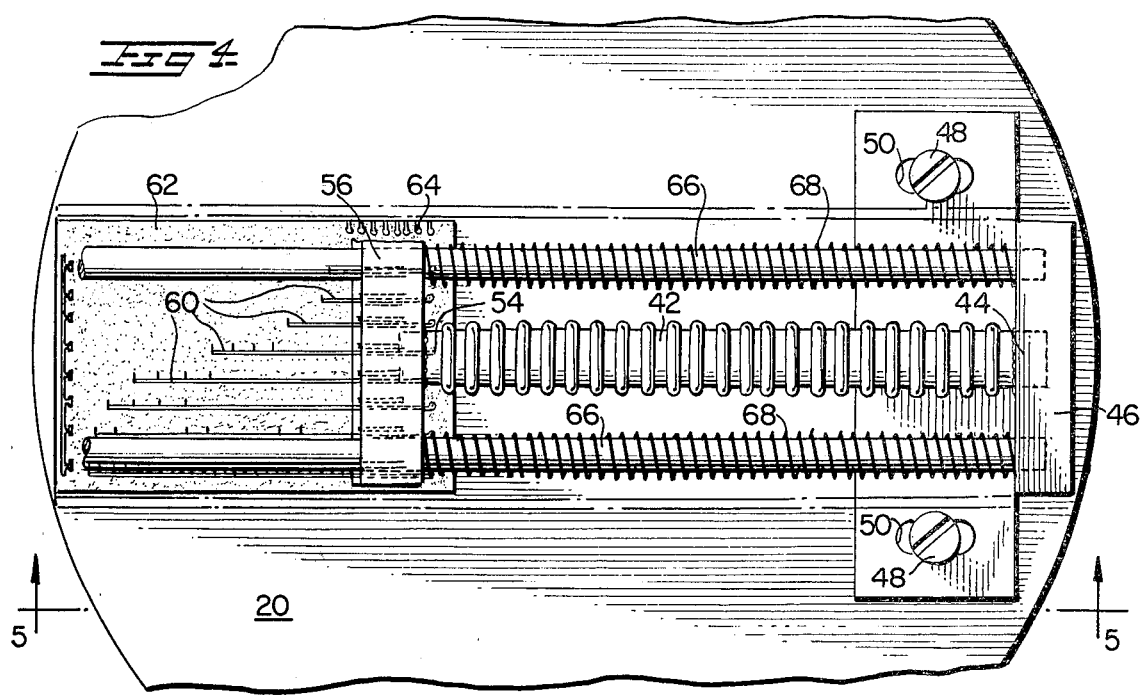
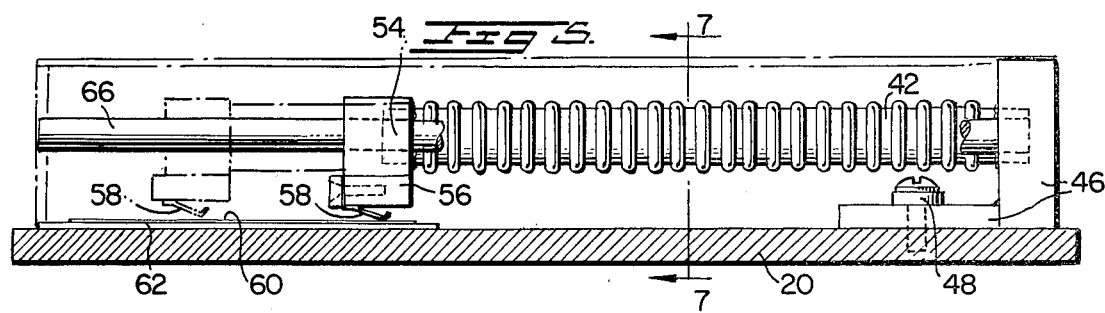
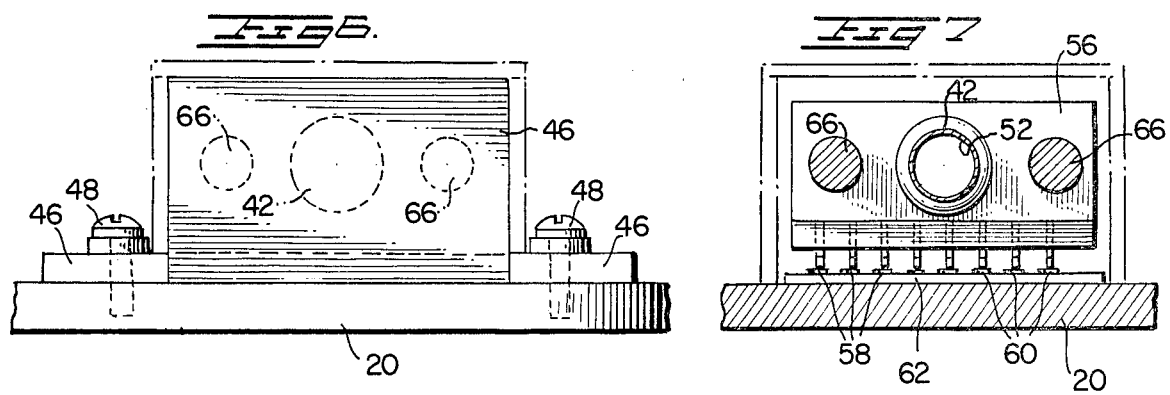

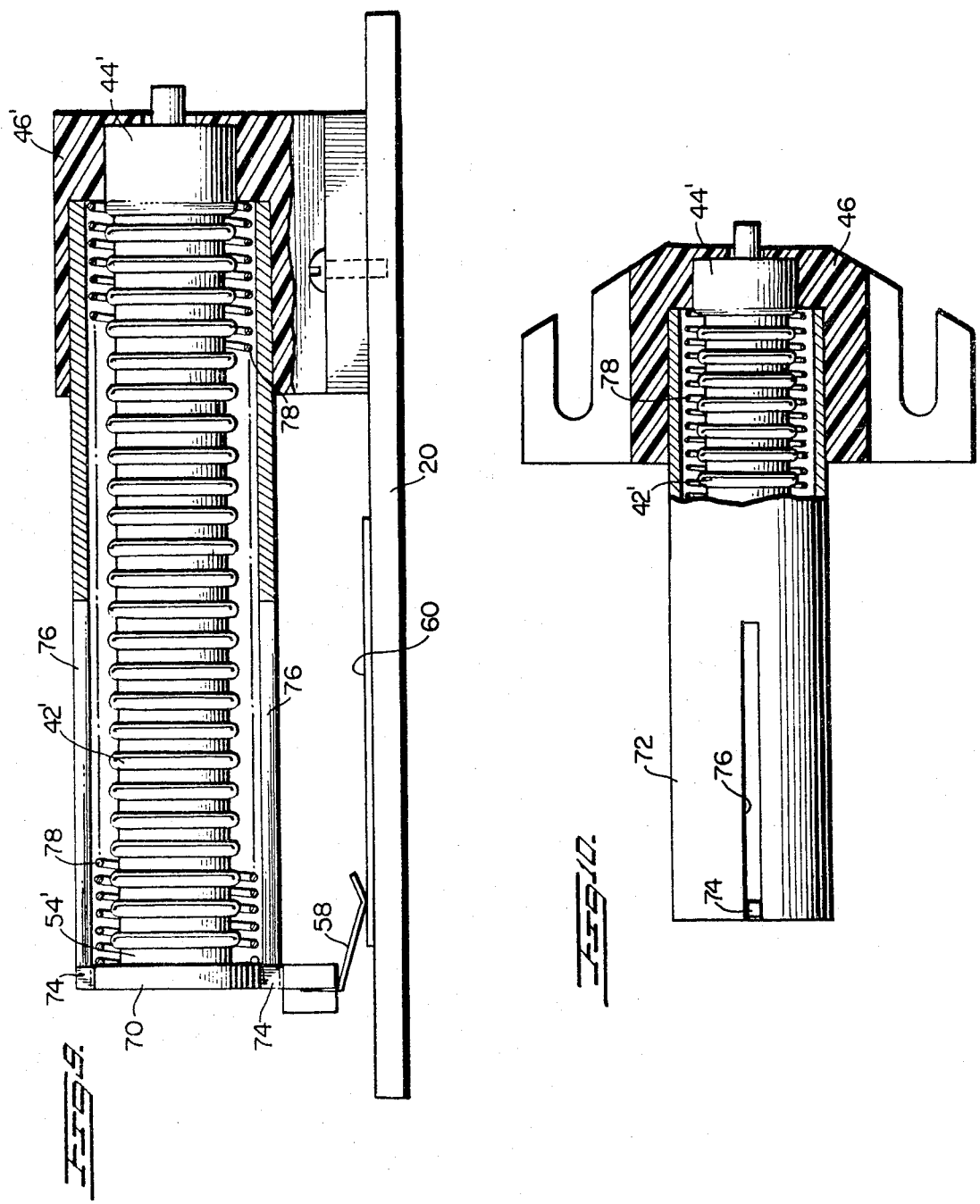

DIVER'S BOTTOM TIMER/DEPTH GAUGE OR THE LIKE AND DIRECT DIGITAL INPUT AND TRACKING SYSTEM THEREFOR

BACKGROUND OF THE INVENTION

This invention relates generally to meters for use by underwater divers and, more particularly, to an electronic apparatus for recording and displaying time/depth data. Although the invention has particular application to sport and recreational diving, it may also be used by other types of divers (commercial, military, scientific and research, etc.) as will become readily apparent hereinbelow.

Of special concern for sport and recreational divers is the accurate recording of the depth of the dive and duration of that dive in order to avoid decompression sickness or the "bends". Additionally, that information must be retained and recalled for appropriate computation if a second or succeeding dives are performed within a twelve hour period of the first dive.

Over the years, the U.S. Navy has developed a set of guidelines for use by the diver so he can plan his dive and avoid the onset of decompression sickness. These guidelines are known as the U.S. Navy Air Decompression Tables or, more commonly, the "tables". Most authorities agree that the tables provide the best guidelines for safe diving by sport divers and avoidance of decompression sickness.

A typical single dive by a sport diver may involve excursions to various depths for various periods of time. According to the tables, the depth of any such dive is the deepest point of that dive and the time of the dive or "bottom time" is calculated from the beginning of the initial descent to the time of an uninterrupted ascent directly to the surface. In order to properly use the tables, then, it is essential that the diver have this information for each and every dive. In addition, proper use of the tables requires that the diver ascend to the surface at a rate of 60 feet per minute.

Current practice in the sport diving community is to provide this essential information by use of a depth gauge and a separate watch or timer. This simultaneous monitoring of two information sources is both difficult in practice and highly subject to erroneous readings and subsequent erroneous calculations by the diver. Additionally, state of the art depth gauges do not provide a retained indication of the maximum depth of the dive; the diver must simply remember the maximum depth attained.

The present invention provides a significant advance in the art in the form of an electronic depth/time recording and displaying instrument which records and displays the following critical information for the diver:

(a) maximum depth attained;
(b) bottom time;
(c) existing depth at any point in the dive;
(d) elapsed time of the dive from initial descent to time of ascent; and
(e) ascent time, to within two feet of the surface.

In addition, the invention further displays the following critical information:

(a) surface time after the dive up to 12 hours or until the invention is reset for a repetitive dive; p1 (b) low battery condition;
(c) lighted display of all readouts; and
(d) flashing, warning display indicating the instrument's limits have been exceeded.

The basic components of the system are both simple and reliable. First, an otherwise conventional Bourdon tube or a novel bellows assembly herein disclosed and claimed continuously monitors ambient pressure and changes therein. An otherwise state of the art microprocessor receives sensed data and computes the depth and elapsed time parameters of the dive. The sensed data is relayed to the microprocessor by a novel, direct digital input and tracking system herein disclosed and claimed which provides the attendant advantages of simplicity and accuracy without need of any analog to digital conversion of data or thus any components and structure to accomplish such conversion.

The following eight prior patents are representative of the present state of the art in the field of the instantly disclosed and claimed invention.

U.S. Pat. No. 2,037,879 issued to Chalatow discloses a Bourdon tube 22 for sensing pressure and having a pivoted control arm 23 at an end thereof which wipes across a series of contacts to generate downstream impules to eventually provide perceived, useful information. Similar teachings appear in U.S. Pat. Nos. 576,208 issued to Lozier and 774,815 issued to Anderson, although in the latter instance at least, the wiped surface is essentially a rheostat. Another Bourdon tube-transducer apparatus is shown in U.S. Pat. No. 3,599,493 issued to Thomas and U.S. Pat. No. 3,593,582 issued to Birkmeyer discloses a bellows tube which expands to close contacts 80, 56 to generate a signal.

The following prior patents are more relevant to the field of underwater diving. U.S. Pat. No. 3,670,575 issued to Emerick discloses a system for reading tank pressure decay and produce a time-left indication for the diver. Other, less relevant disclosures of watch-/depth meter combinations are disclosed in U.S. Pat. Nos. 3,377,860 issued to Masters and 3,696,610 issued to Charbonnier.

A popular device known as the "decompression meter" or simply the "meter" has been marketed by Scubapro of Compton, Calif. for years and is disclosed and claimed in U.S. Pat. No. 3,121,333 issued to Alinari. The "meter", however, includes no electronic circuitry. Rather, it is an uncomplicated analog device which gives a more or less reliable indication of the degree of nitrogen gas load in the diver's body. No watch or time elapsed device is incorporated in the "meter".

More recently, Dacor Corporation of Northfield, Ill. has announced plans to market a dive computer which combines a variety of devices including a depth gauge, a watch and a computer programmed to utilize the U.S. Navy Air Decompression Tables. LED readouts are provided thus requiring a rather substantial power source and a pressure transducer is employed to provide pressure information for the circuitry and microprocessor or computer. Up to ten readouts are provided, which may confuse the diver and, due to power requirements, only a 10% on-time is provided, meaning the diver will spend most of his dive without any information.

Conversely, the present invention provides an accurate and reliable dive timer or watch and depth gauge which is conveniently packaged in a small case about the size of a present day depth gauge and thus is easily worn on the wrist. Power requirements are minimal and LCD readouts are provided so the diver has constant, updated information. The U.S. Navy Air Tables are not built into the instrument; rather, reliable and accurate time of dive and maximum depth information is provided the diver and retained in the instrument so the diver may easily calculate his repetitive dive profile. In place of a pressure transducer, the accuracy and reliability of which are at least questionable, a novel, pressure sensitive bellows assembly is provided with a plurality of wipers or fingers tracked across a patterned (e.g., photo-etched) substrate for direct digital input of pressure information to a small microprocessor or computer without need of any analog to digital data conversion. The instrument is rather uncomplicated in structure and thus reliable in service.

SUMMARY OF THE INVENTION

Accordingly, it is a principal object of the invention to provide a fully electronic instrument such as an underwater diver's bottom timer/depth gauge combination which directly converts a mechanical input (e.g., pressure) into digital signals that are downstream processed into useful information without need of an analog to digital converter or a conventional pressure transducer.

It is another object of the invention to provide a fully electronic diver's bottom timer/depth gauge having a pressure sensitive bellows assembly in place of the common state of the art Bourdon tube, which thus has no prone-to-error linkage or geared movement and which expands and contracts in a linear fashion, a series of wiping fingers being mounted on the movable end of the bellows and tracking across a signal transmitting substrate array to generate useful information for a microprocessor which stores and provides critical dive profile information for the diver.

It is a further object of the invention to provide a fully electronic, self-contained diver's bottom timer/depth gauge instrument of a compact size approximating that of a standard depth gauge, which may be strapped easily to the wrist of the diver or easily mounted in a common diver's console board attached to the submersible pressure gauge and not only replaces the usual depth gauge and watch or timer instruments but also stores critical data for later recall and provides further information not provided by a depth gauge or watch, alone or in combination.

Still another object of the invention is to provide a diver's electronic bottom timer/depth gauge which is of rugged and uncomplicated construction and thus is low in cost of manufacture so as to be priced within an affordable range which is attractive to the sport and recreational diving public.

Basically, the invention appears to be about the size of a large watch or a small depth gauge with overall dimensions of about 1¾ inches in diameter and about ½ inch in thickness. Five simple pieces comprise the entire instrument, including: a case having a number of actuating buttons or switches thereon an interior, oil filled rubber boot; a plastic encapsulated circular p.c. (polyvinyl chloride) board having pressure sensitive means and processing electronics on the reverse side and two LCD readout displays on the obverse side thereof; a clear crystal on top of the p.c. board; and a bezel, threaded to the case, to clamp the parts in assembly. Wristwatch type straps may be provided on the case so the diver may secure the instrument to his wrist. The case is ported so that ambient pressure reaches the boot. Pressure is transmitted through the oil in the boot to a pressure responsive bellows assembly having an array of spring finger probe which track across a patterned array on the p.c. board or substrate on the p.c. board. This substrate provides direct digital input for a microprocessor which computes the depth and time parameters of the dive and transmits that information to the LCD displays. The substrate is a predetermined array of seven input lines to provide binary coded information to the microprocessor. The instrument thus displays and records: maximum depth attained; bottom time; existing depth at any point in the dive; elapsed time of the dive; and ascent time, until 2 feet below the surface. The instrument displays: surface interval time, up to 12 hours until reset for a repetitive dive; low battery condition; a lighted display via a switch; and a flashing display to indicate that the instrument's operational limits have been exceeded.

BRIEF DESCRIPTION OF THE DRAWINGS

These and further objects and advantages of the invention as well as details of construction and operation will become readily apparent by reference to the below detailed specification and attached drawings in which:

FIG. 1 is a perspective view of a preferred embodiment of the invention in assembly;

FIG. 2 is an exploded, perspective view of the basic components of the invention;

FIG. 3 is a bottom, plan view of the p.c. board with the pressure sensor and electronics mounted thereon, taken along line 3—3 of FIG. 2;

FIG. 4 is an enlarged, partial plan view of one embodiment of a bellows pressure sensor of the invention;

FIG. 5 is a side elevation view taken along lines 5—5 of FIG. 4;

FIG. 6 is an end view of the bellows pressure sensor shown in FIG. 5 and taken from the right hand side of FIG. 5;

FIG. 7 is a section view taken along lines 7—7 of FIG. 5;

FIG. 8 is a plan view of the LCD readouts of the invention;

FIG. 9 is an elevation view of a preferred embodiment of the pressure sensitive bellows of the invention;

FIG. 10 is a partial plan, top view of the bellows shown in FIG. 9;

DESCRIPTION OF THE PREFERRED EMBODIMENTS

Figure 11:
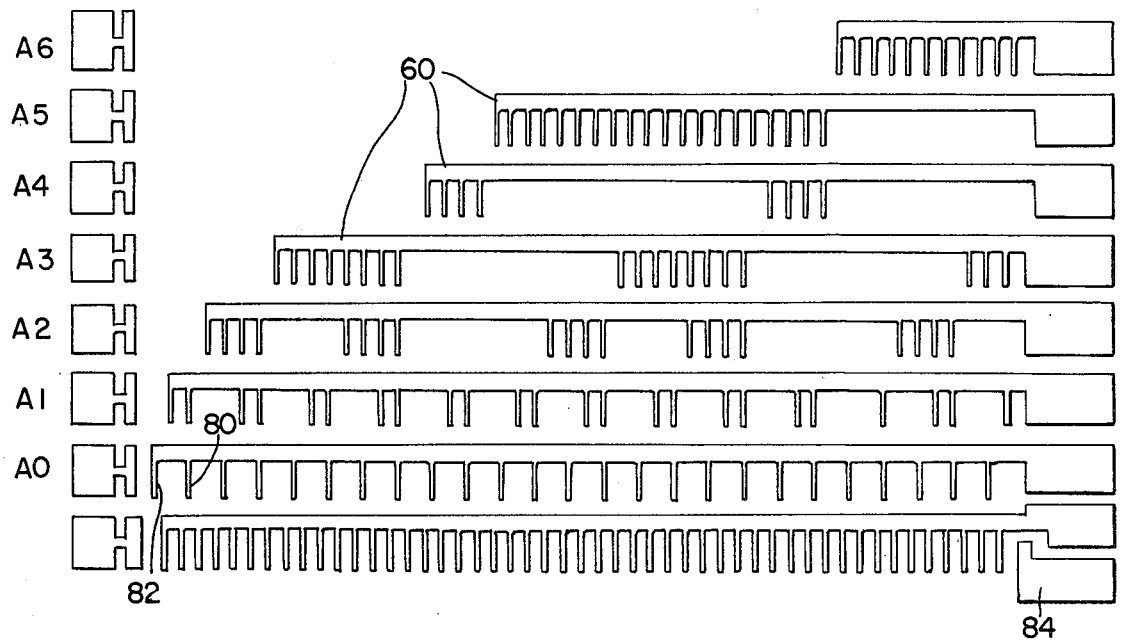
FIG. 11 is a plan view of the patterned substrate of the invention.

Referring now to the drawings by reference character, a preferred embodiment of the invention is illustrated in FIG. 1, including a case 10 with wristwatch type straps 12 so the diver may conveniently mount the instrument on his wrist. Alternatively, the instrument may be mounted in a conventional diver's console along with a submersible pressure gauge (not shown). A pair of manually operated button switches 14, 16 are illustrated for controlling various functions of the instrument. In a preferred embodiment, two more such switches are provided on the other side of the case (not shown) from switches 14, 16, in approximately the same position, plus one switch (not shown) on the back side 10 for on and off battery power.

Turning now to FIG. 2, the basic components of the instrument include the case 10, a plastics material or rubber boot 18, filled with an oil which is non-conductive to C-mos, above 1 meg. ohm, a p.c. mounting board 20 for mounting on its reverse side the pressure sensor 22 and (see FIG. 3) a power source or battery 24, a low battery capacitor 26, a trimming capacitor 28 and a microprocessor 30, and on its obverse side a pair of LCD readouts 32 and 34, a transparent crystal 36 over the readouts 32 and 34, and a bezel 38, threaded to case 10 at 40 to hold all of the components in assembly.

Referring now to FIGS. 4, 5, 6 and 7, one embodiment of pressure sensor 20 and the direct digital input and tracking system of the invention will be discussed. A pressure responsive, linearly movable bellows assembly 42 has an end 44 fixed to a mounting block structure 46 secured to p.c. board 20 by mounting screws 48 through slots 50 so the assembly 42 may be adjustable for calibration purposes. The bellows has an interior 52 sealed at 1 atmosphere of pressure. Thus, with increasing ambient pressure, the bellows 42 will contract. Since end 44 is fixed, end 54 will move linearly in response to ambient pressure variation.

Movable end 54 includes a block 56 mounting a plurality of spring finger contacts 58 therebeneath, these being eight in number in this embodiment of the invention, as shown in FIG. 7. Contacts 58 track along respective binary input lines 60 which are arrayed in preplanned fashion on a base 62. (Ordinarily, lines 60 will be produced by photoetching). Signals generated are conveyed to microprocessor 30 by leads 64 (FIG. 4). To assure precise linear movement of bellows end 54, a pair of guide rods 66 are provided, through blocks 56. Coil return springs 68 are mounted about rods 66 to assist movement of block 56 and bellows end 54 to a bellows expanded state, or to the left in the sense of FIG. 4, when ambient pressure decreases.

A preferred embodiment of bellows assembly 42 is illustrated generally in FIGS. 9 and 10 and is referred to by reference numeral 42'. A mounting block 46' fixes end 44' of bellows 42'. Instead of block 56, a guide plate 70 is mounted on movable end 54' of bellows 42'. A concentric guide tube 72 is mounted over bellows 42' and includes a pair of opposed extensions 74 which ride in opposed slots 76 formed in tube 72, to thus assure linear movement of bellows end 54'. The constructions and arrangement of contacts 58 and binary lines 60 is the same as hereinbefore described. A single return spring 78 is concentrically mounted between bellows 42' and tube 72. End 44' is sealed, ordinarily, but may be opened for ambient pressure input in other applications of this invention.

A preferred embodiment of binary lines 60 is illustrated in FIG. 11. The lines are patterned in binary code fashion to provide transmission of data to the computer or microprocessor 30. In this instance, seven input lines numbered A0 through A6 are provided. Contacts 58 will track from left to right with increasing pressure which is converted by microprocessor 30 to display depth in feet of water at display 34 (FIG. 8). A timing clock in microprocessor is started when 10 feet of pressure is sensed, in line A0 at 80 and displayed at 32 (FIG. 8). Upon return of the diver to the surface, the clock will automatically stop when fingers 58 move to the left of point 82 on line A0 (actually, this will occur about 2 feet below the surface.) At the extreme right hand side of FIG. 11, a binary input 84 is indicated, in this embodiment, contact of a finger 58 with input 84 causes the displays 32 and 34 to flash, indicating that the depth limits of the instrument (in this case, 253 feet) have been exceeded.

The remaining lines A0–A6 are arrayed in binary code fashion, viz:

| A0 | A1 | A2 | A3 | A4 | A5 | A6 | Feet |
|----|----|----|----|----|----|----|------|
| 0 | 0 | 0 | 0 | 0 | 0 | 0 | 0 |
| 1 | 0 | 0 | 0 | 0 | 0 | 0 | 5 |
| 0 | 1 | 0 | 0 | 0 | 0 | 0 | 10 |
| 1 | 1 | 0 | 0 | 0 | 0 | 0 | 15 |
| 0 | 0 | 1 | 0 | 0 | 0 | 0 | 20 |
| . | | | | | | | |
| . | | | | | | | |
| 0 | 1 | 0 | 1 | 0 | 1 | 0 | 150, | and so on. Thus, it is seen that depths will be indicated in 5 foot increments of dive depth.

Figure 12:
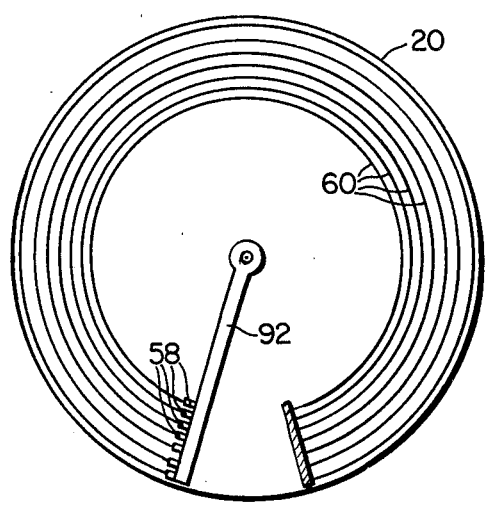
FIG. 12 is a plan view of a Bourdon tube assembly, modified in accordance with the teachings of the instant invention.
Figure 13:
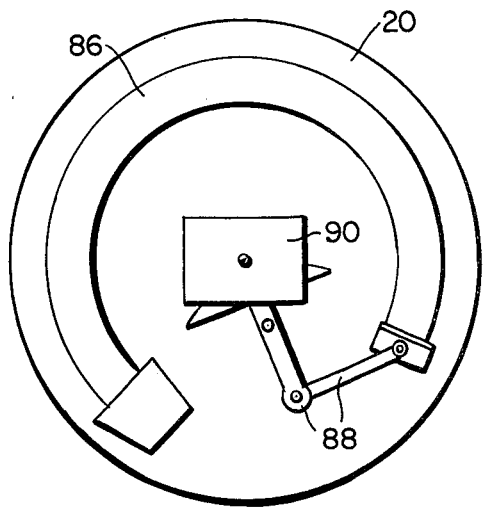
FIG. 13 is a plan view of the reverse side of the assembly illustrated in FIG. 12.

A Bourdon tube embodiment of the invention is illustrated in FIGS. 12 and 13. An otherwise conventional Bourdon tube 86 (FIG. 13) is mounted on board 20 and includes linkage 88, gear box 90 and sweep dial hand 92 (FIG. 12). In response to increasing pressure, hand 92 will move clockwise about board 20, in the sense of FIG. 12. Contacts 58 are mounted on hand 92 as shown and binary lines 60 are arrayed in concentric circular fashion about board 20 instead of linearly, as in the case of the previously described embodiments.

In this embodiment, there are 5 externally operated button switches on the instrument, two of which are illustrated at 14, 16. One is a power "on" switch which resets all stored information to zero and provides power to all of the electronics. A second switch is a bottom time latch switch, which the diver may depress to record elapsed bottom time before ascending to the surface. (If he forgets, the time will be latched and stored automatically when he reaches the surface as described above.) Once pressed, a second time will begin in seconds from zero so the diver may accurately monitor a 60 foot per minute ascent rate. Colons in display 32 flash at one second intervals to assist the diver further. Pushing this switch again resets the second clock without affecting the first time so the diver may time individual decompression stops, if required by that dive profile.

A third switch provides back up bottom time and is activated only when the diver forgets to depress the bottom time switch just described.

A fourth switch is a recall switch, upon depression, it will provide a three second display of elapsed time of the dive so far. Thus, it is not necessary for the diver to remember bottom time; it is constantly available to him.

A fifth maximum dive depth switch provides a momentary display at 34 of the deepest depth of any particular dive.

Referring now to FIG. 8, three indicator flags 94, 96 and 98 are illustrated. The horizontal flag 94 comes on at 5' intervals and is especially useful when decompressing. The flag remains on when the diver is at a depth which is a multiple of 5 (e.g., 5 feet, 10 feet, 15 feet and so forth).

The vertical dash flags 96 and 98 will flash when the maximum depth is being displayed; this assures the diver that he has activated the correct switch.

When the diver exceeds the maximum depth the instrument can record and a contact 58 hits input 84 (FIG. 11), depth information is continually flashed. This also tells the diver not to rely on any information stored in the instrument because its limits have been exceeded.

All time information flashes when the battery is low, thus indicating, of course, a low battery condition.

As set forth above, the colons in display 32 flash during ascent so the diver can monitor a proper ascent rate.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A direct digital input and tracking system for converting mechanical movement input into a predetermined digital input for a microprocessor or the like comprising: a plurality of movable contacts in a predetermined arrangement, said contacts being moved in response to a sensed condition such as variation in ambient pressure; and a patterned array of coded, binary input lines located beneath said contacts, one binary line for each said contact, said binary lines being connected to a microprocessor or computer in preplanned fashion, whereby the sensed condition is directly converted into binary signals without need of any analog to digital conversion means, said sensed condition being variation in ambient pressure, said system further comprising a pressure sensitive bellows assembly having a fixed end and an opposite end linearly movable in response to said sensed condition, said movable contacts being fixed to said bellows movable end, said binary input lines being arranged in linear fashion beneath said movable contacts.

2. A direct digital input and tracking system for converting mechanical movement input into a predetermined digital input for a microprocessor or the like comprising: a plurality of movable contacts in a predetermined arrangement, said contacts being moved in response to a sensed condition such as variation in ambient pressure; and a patterned array of coded, binary input lines located beneath said contacts, one binary line for each said contact, said binary lines being connected to a microprocessor or computer in preplanned fashion, whereby the sensed condition is directly converted into binary signals without need of any analog to digital conversion means, said condition being variation in ambient pressure, said system further comprising a pressure sensitive Bourdon tube having a fixed end and an opposite end movable in response to said sensed condition, a lever and gear box and sweep dial hand assembly being connected to said Bourdon tube movable end, said dial hand thus being moved in circular fashion in response to said sensed condition, said movable contacts being fixed to said dial hand and said binary input lines being arranged in concentric circular fashion beneath said movable contacts.

3. An electronic bottom timer and depth gauge instrument for use by underwater divers comprising: a case closed by a transparent crystal and bezel; a power source within said case; means within said case movable in response to variation in ambient pressure; a plurality of contacts fixed to said movable means, a patterned array of coded, binary input lines located adjacent said contacts, one for each contact, a microprocessor for receiving signals from and generating signals to said array and for converting said signals into useful information; and readout means beneath said crystal and in association with said microprocessor for visually displaying depth and time of dive information, said instrument further comprising an oil filled boot within said case for encapsulating said movable means, said contacts, and said array; said movable means being a linear bellows assembly having a fixed end and a movable end, said bellows contracting in length whereby said movable end approaches said fixed end as ambient pressure increases, said contacts being fixed to said bellows movable end, said contacts and binary input lines being of preplanned arrangement and number to provide time of dive and depth of dive information to said readout means in response to movement of said contacts along said binary lines.

4. The instrument as claimed in claim 3 wherein said movable means further comprises spring means for assisting movement of said bellows movable end away from said bellows fixed end in response to decreasing ambient pressure.

5. An electronic bottom timer and depth gauge instrument for use by underwater divers comprising: a case closed by a transparent crystal and bezel; a power source within said case; means within said case movable in response to variation in ambient pressure; a plurality of contacts fixed to said movable means, a patterned array of coded, binary input lines located adjacent said contacts, one for each contact, a microprocessor for receiving signals from and generating signals to said array and for converting said signals into useful information; and readout means beneath said crystal and in association with said microprocessor for visually displaying depth and time of dive information, said movable means comprising an otherwise conventional Bourdon tube, lever, gear box and sweep dial hand assembly, said contacts being fixed to said dial hand, said binary lines being arranged in predetermined, concentric circular fashion beneath said contacts.

6. The instrument as claimed in claims 3 or 5 wherein said case further comprises a plurality of externally located, manually operated switch means for stopping and starting functions of said microprocessor and for displaying alternative dive profile information on said readout means.

* * * * *